(12) United States Patent
Benkreira et al.

(10) Patent No.: US 10,482,452 B1
(45) Date of Patent: Nov. 19, 2019

(54) PAYMENT APPARATUS

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/256,686

(22) Filed: Jan. 24, 2019

(51) Int. Cl.
*G06Q 20/32* (2012.01)
*G06K 19/077* (2006.01)
*G06K 19/07* (2006.01)

(52) U.S. Cl.
CPC ..... *G06Q 20/3278* (2013.01); *G06K 19/0723* (2013.01); *G06K 19/07739* (2013.01); *G06K 19/07762* (2013.01)

(58) Field of Classification Search
CPC ......... G06Q 20/3278; G06K 19/07762; G06K 19/07739; G06K 19/0723
See application file for complete search history.

(56) References Cited

U.S. PATENT DOCUMENTS

| | | | |
|---|---|---|---|
| 2008/0116283 A1* | 5/2008 | Newbrough | B67B 7/16 235/487 |
| 2010/0108755 A1 | 5/2010 | Fuerstenberg et al. | |
| 2015/0227828 A1 | 8/2015 | Niblett et al. | |

FOREIGN PATENT DOCUMENTS

RU 131548 8/2013

* cited by examiner

*Primary Examiner* — Sonji N Johnson
(74) *Attorney, Agent, or Firm* — DLA PIPER LLP (US)

(57) ABSTRACT

An apparatus is disclosed herein. The apparatus includes a first liner, a second liner, one or more fastening components, and one or more prongs. The one or more fastening components couples the first liner to the second liner, defining an opening between. The one or more prongs are positionable between a closed position within the opening and an open position exterior to the opening. The one or more prongs include a payment prong. The payment prong includes a body free, a payment chip receptacle, and a payment chip. The body is free from any personal identification information. The payment chip receptacle is attached to the body. The payment chip is positioned in the payment chip receptacle. The payment chip is removable therefrom.

19 Claims, 4 Drawing Sheets

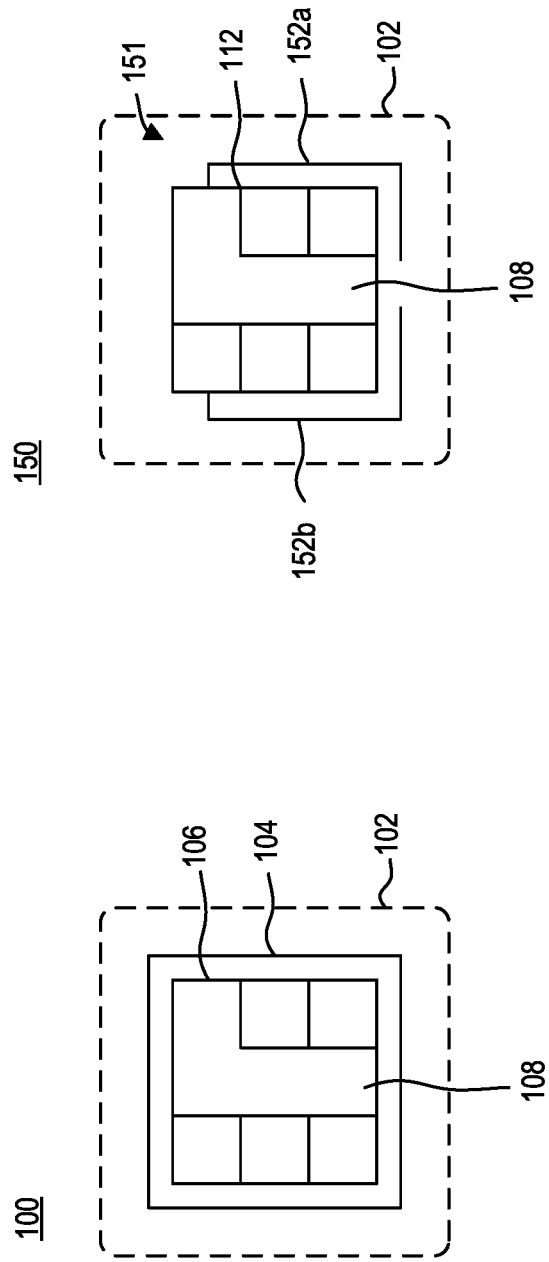

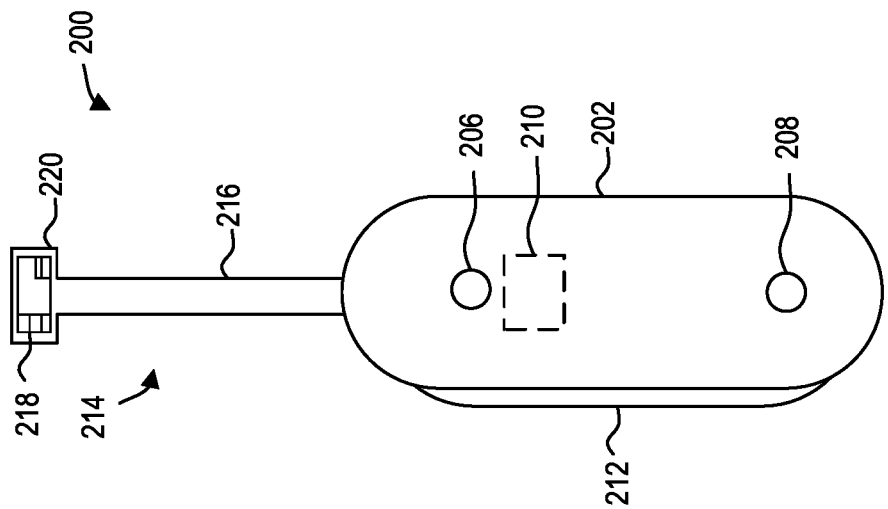
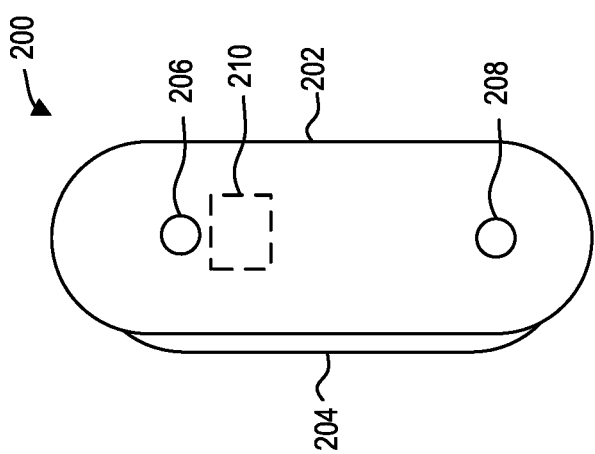

PAYMENT APPARATUS

FIELD OF THE DISCLOSURE

The present disclosure generally relates to a payment apparatus and a method of operating the same.

BACKGROUND

Currently, there are various means in which consumers may transact with third party vendors. Credit card products are one instrument that are offered and provided to consumers by credit card issuers (e.g., banks and other financial institutions). With a credit card, an authorized consumer is capable of purchasing services and/or merchandise without an immediate, direct exchange of cash. Rather, the consumer incurs debt with each purchase. Debit cards are another type of instrument offered and provided by banks (or other financial institutions) that are associated with the consumer's bank account (e.g., checking account). Transactions made using a debit card are cleared directly from the cardholder's bank account. Contactless payment chips may be implemented with both credit cards and debit cards. Contactless payment chips allow users to make secure payment implementing wireless technology without any insertion or swiping of the payment card.

SUMMARY

Embodiments disclosed herein generally relate to a payment device and a method of operating the same. The apparatus includes a first liner, a second liner, one or more fastening components, and one or more prongs. The one or more fastening components couples the first liner to the second liner, defining an opening between. The one or more prongs are positionable between a closed position within the opening and an open position exterior to the opening. The one or more prongs include a payment prong. The payment prong includes a body free, a payment chip receptacle, and a payment chip. The body is free from any personal identification information. The payment chip receptacle is attached to the body. The payment chip is positioned in the payment chip receptacle. The payment chip is removable therefrom.

In some embodiments, the body includes a shaft. The shaft extends between the payment chip receptacle and the opening. The shaft includes one or more openings formed therethrough. Each of the one or more openings is configured to receive each of the one or more fastening components.

In some embodiments, the shaft includes one or more printed circuits contained therein. The one or more printed circuits contact the payment chip at one or more contact points.

In some embodiments, the apparatus further includes a power source positioned within the opening. The power source is coupled to each of the one or more printed circuits.

In some embodiments, the one or more printed circuits enable the payment chip to communicate with external device via a wireless connection.

In some embodiments, the wireless connection is one of radio frequency identification (RFID), near field communication (NFC), or Bluetooth.

In some embodiments, the shaft is formed from a non-metal material.

In some embodiments, the payment chip receptacle fully surrounds the payment chip.

In some embodiments, the payment chip receptacle includes two or more arms configured to hold the payment chip in position.

In some embodiments, the one or more prongs further include one or more tools.

In another embodiment, a payment device is disclosed herein. The payment device includes a multi-tool apparatus, a payment chip receptacle, and a payment chip. The multi-tool apparatus includes a body free from any personal identification information. The payment chip receptacle is coupled with the body. The payment chip receptacle includes two or more arms movable between an open position and a closed position. The payment chip is positioned in the payment chip receptacle. The payment chip is secured by the two or more arms. The payment chip is removable from the payment chip receptacle when the two or more arms are in the open position.

In some embodiments, the payment chip is secured to the payment chip receptacle when the two or more arms are in the closed position.

In some embodiments, the payment chip receptacle is coupled to a tool of the multi-tool apparatus.

In some embodiments, the payment device further includes a printed antenna integrated with the tool of the multi-tool apparatus, the printed antenna coupled with the payment chip.

In some embodiments, the multi-tool apparatus further includes a power source disposed therein.

In some embodiments, the tool of the multi-tool apparatus is formed from a non-metal material.

In some embodiments, the tool of the multi-tool apparatus is movable between a closed position within the body of the multi-tool apparatus and an open position exterior to the body of the multi-tool apparatus.

In some embodiments, the payment chip receptacle fully surrounds the payment chip.

In some embodiments, the payment chip receptacle is formed from a non-metal material.

In another embodiment, a method of activating a payment device is disclosed herein. The method includes removing, from a body free from personal identification information, a compromised payment device housed in the body. The method further includes positioning, in the body, a new payment device. The new payment device is positioned in a payment device receptacle of the body. The method further includes activating the new payment device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 1A is a block diagram illustrating a payment device, according to one embodiment.

FIG. 1B is a block diagram illustrating payment device, according to one embodiment.

FIG. 2A is a block diagram illustrating a payment device, according to one embodiment.

FIG. 2B is a block diagram illustrating payment device, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 3:
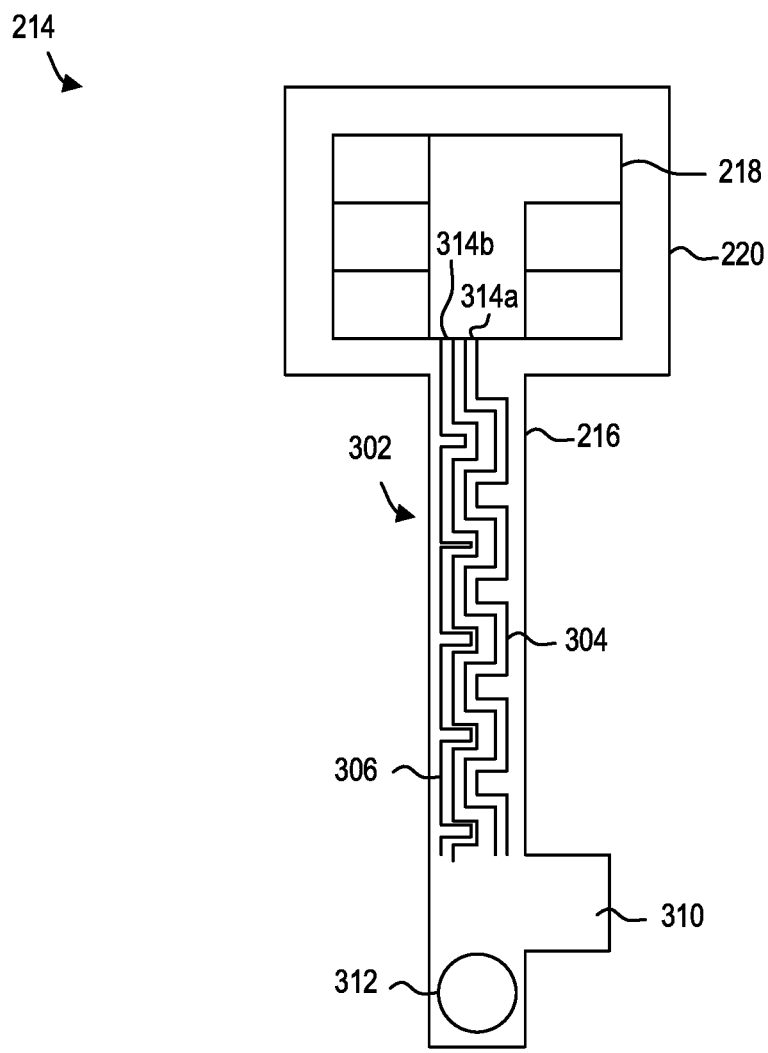
FIG. 3 is a block diagram illustrating payment device tool in greater detail, according to one embodiment.

One or more techniques disclosed herein generally relate to an improved payment device, and one or more methods of operating the same. Conventional payment devices such as credit card products and debit card products typically include at least a magnetic stripe or a payment chip positioned thereon. The magnetic stripe may store data, which is read at a point-of-sale terminal, upon swiping by a user or third party individual. The payment chip may be implemented with a "smart card" device. The payment chip may take the form of an integrated circuit exposed on a surface of the payment device. The payment chip may store information, similar to that of the magnetic stripe, which is read upon insertion of the payment card (and payment chip) into a point-of-sale terminal.

As technology has improved, such payment devices may further implement a contactless payment chip. The contactless payment chip eliminates the need for a physical swipe or insertion of the payment device at the point-of-sale terminal. Instead, the contactless payment chip leverages wireless communication channels to communicate with the point-of-sale terminal. For example, the payment chip may emit one or more radio waves that are read (or processed) by the point-of-sale terminal.

There remains, however, a constant battle between fraudulent individuals and financial institutions in protecting against fraudulent transactions. Typically, when a financial institution identifies fraudulent activity on a user's account, the financial institution may place a transaction freeze on the user's payment device connected to that account. Financial institution may then issue an entirely new payment device. During the time between the transaction freeze and upon receipt of the new payment device, the user is simply unable to use the compromised payment device.

The one or more techniques disclosed herein provide a novel approach to providing users with an updated payment device upon determining that the prior payment device was compromised. For example, rather than replacing the entire compromised payment device (substrate and all), the one or more techniques disclosed herein provide a new contactless payment chip which may replace the compromised payment chip in the compromised payment device. Such capability allows the payment device to take on non-traditional forms. For example, some embodiments discussed below illustrate a payment device taking the form of a tool prong on a pocketknife or multi-tool apparatus. Because the one or more techniques disclosed herein allow end users to only replace the contactless payment chip itself, end users only need to substitute out a payment chip from a tool prong of the pocketknife, rather than the entire tool prong or the entire pocketknife. Those skilled in the art may readily understand that such approach may be applied to several form-factors that include, but are not limited to, clothing (e.g., cufflinks, bracelets, glasses, etc.) or clothing (e.g., shirt sleeve).

FIG. 1A is a block diagram illustrating a payment device 100, according to one embodiment. Payment device 100 may include a substrate 102. Substrate 102 may be representative of any body that is capable of supporting a payment chip thereon. In some embodiments, substrate 102 may be representative of a credit card, a debit card, a gift card, and the like. In some embodiments, substrate 102 may be representative of a Swiss-army knife, a keychain dongle, or the like. Substrate 102 may be formed of any suitable material, such as, but not limited to, plastic-material, metal-material, synthetic-material, and the like. Generally, substrate 102 may be free from any personal identification information. In other words, unlike traditional payment devices (e.g., credit card, debit card, gift card, etc.), substrate 102 may not include any information that may be used to identify user (or owner) of payment device 102.

Payment device 100 may further include a payment chip receptacle 104 and a payment chip 108. Payment chip receptacle 104 may be positioned on substrate 102. Payment chip receptacle 104 may define a payment chip receiving area 106. Payment chip receiving area 106 may be configured to receive a payment chip thereon. In some embodiments, such as that shown in FIG. 1A, payment chip receptacle 104 may substantially surround payment chip 108. For example, payment chip receptacle 104 may envelop payment chip 108.

Generally, payment chip 108 may be moved into and out of payment chip receptacle 104. For example, if payment chip 108 becomes compromised, rather than destroying the entire payment device 100, user of payment device 100 may request a new payment chip 108 that may replace the existing payment chip 108.

FIG. 1B is a block diagram illustrating payment device 150, according to one embodiment. Payment device 150 may be substantially similar to payment device 100. For example, payment device 150 may include substrate 102 and payment chip 108. Payment device 150 may further include payment chip receptacle 151. Payment chip receptacle 151 may be positioned on substrate 102. Payment chip receptacle 151 may define a payment chip receiving area 112. Payment chip receiving area 112 may be configured to receive payment chip 108 thereon.

As shown, payment chip receptacle 151 may include two or more movable arms 152a and 152b. Each removable arm 152a, 152b may be movable between an open position and a closed positioned. When removable arms 152a, 152b are in the open position, payment chip 108 may be removed therefrom or positioned therein payment chip receptacle 151. When removable arms 152a, 152b are in the closed position, payment chip 108 may be locked, or positioned, into place.

FIG. 2A is a block diagram illustrating a payment device 200, according to one embodiment. As illustrated, payment device 200 may take the form of a pocketknife (e.g., Swiss Army knife) or a multi-tool apparatus.

Payment device 200 may include a body 202. Although not shown, body 202 may include a first portion and a second portion. The first portion may be coupled to the second portion via one or more connectors (e.g., screws). As illustrated, body 202 may include one or more fasteners 206 and 208 positioned therein. One or more fasteners 206 and 208 may be configured to couple the first portion and the second portion. One or more fasteners 206 and 208 may further be configured to support one or more tools 204. For example, each tool 204 may be movable about an axis, through which either fastener 206 or fastener 208 passes. As shown in FIG. 2A, each tool 204 is in a closed position.

One or more tools 204 may include a payment device tool, which is illustrated in FIG. 2B and discussed below. In some embodiments, payment device 200 may further include a power source 210. Power source 210 may be configured to supply power to payment device tool.

FIG. 2B is a block diagram illustrating payment device 200, according to one embodiment. As illustrated, payment device 200 includes payment device tool 214. Payment device tool 214 is illustrated in an extended (or open) position. Payment device tool 214 may include a shaft 216 coupled to a payment device receptacle 220. In some embodiments, shaft 216 and payment device receptacle 220 are formed from a continuous body. Shaft 216 and payment device receptacle 220 may be formed from a non-metallic material. Such materials may include polyvinyl chloride acetate (PVCA), plastic, PVC, rubber, wood, Styrofoam, fiberglass, resin, and the like. Payment device receptacle 220 may be configured to receive payment chip 218. For example, payment chip 218 may be removable from payment device receptacle 220.

As shown, payment device 200 may include one or more other tools 212. Each of the one or more other tools 212 may be positioned in a closed position (e.g., within body 202).

FIG. 3 is a block diagram illustrating payment device tool 214 in greater detail, according to one embodiment. As illustrated, payment device tool 214 may further include a communication apparatus 302. Communication apparatus 302 may be configured to allow payment chip 218 to communicate with one or more external devices (e.g., point-of-sale terminal, smartphone, computing devices, and the like).

Communication apparatus 302 may include circuit 304 and circuit 306. Circuit 304 may be coupled to payment chip 218 at contact point 314a. Circuit 306 may be coupled to payment chip 218 at contact point 314b. Circuit 304 and circuit 306 may be formed of any suitable material, such as, but not limited to, copper, foil, tin, and any other suitable material. In some embodiments, circuit 304 and circuit 306 may be printed thereon. In some embodiments, each of circuit 304 and circuit 306 may be antennae. Circuit 304 and circuit 306 may enable the payment chip 218 to communicate with external device via a wireless connection. Such wireless connections may include, but are not limited to, radio frequency identification (RFID) or near field communication (NFC). Generally, in operation, payment chip 218 may communicate with a point-of-sale terminal via, for example, a short range wireless communication channel. Point-of-sale terminal may constantly (or sometimes, periodically) emit a signal. When payment chip 218 is proximate the point-of-sale terminal, payment chip 218 may receive power via the point-of-sale terminal by entering a field created by the signals emitted by the point-of-sale terminal. As such payment chip 218 may be provided with the necessary power to transmit information to the point-of-sale terminal to conduct the transaction.

Further, in some embodiments, each circuit 304, 306 may be coupled to power source 210. Power source 210 may enable payment chip 218 to wirelessly communicate with a point-of-sale terminal via longer range wireless communication channel. For example, such longer range wireless communication channels may include, but are not limited to Bluetooth, ZigBee, Wi-Fi, 4G/LTE, and the like.

Payment device tool 214 may further include a base 310. Base 310 may remain positioned within body 202 during operation. Base 310 may include opening 312. Opening 312 may be configured to receive a fastener 206, 208 from payment device 200. For example, as illustrated, opening 312 may be configured to receive fastener 206, such that payment device tool 214 can pivot about an axis passing through opening 312.

As illustrated, all components of payment device 200 are free from personal identification information. As such, third parties are unable to snoop or steal personal identification information form payment device 200 to be used in possible fraudulent transactions.

Figure 4:
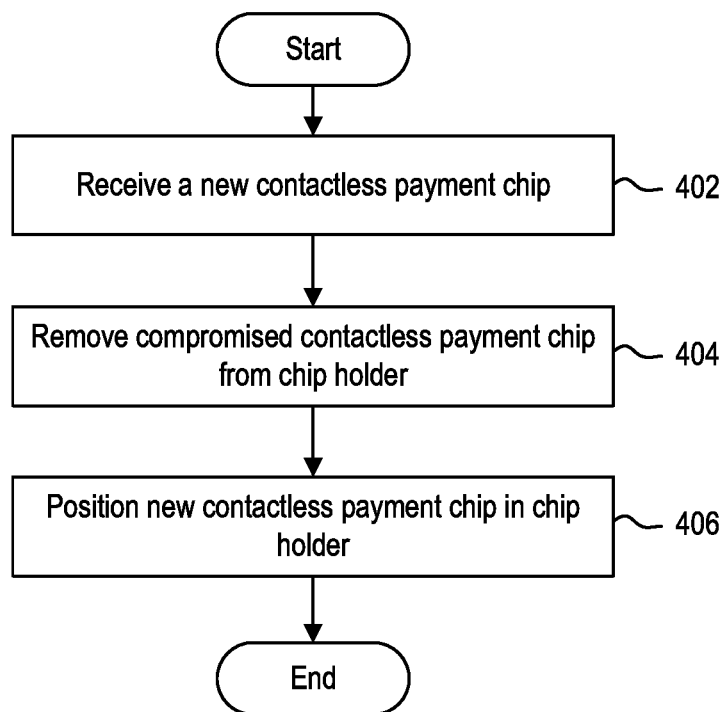
FIG. 4 is a flow diagram illustrating a method of activating a payment device, according to one exemplary embodiment.

FIG. 4 is a flow diagram illustrating a method 400 of activating a payment device (e.g., payment device 100, payment device 150, or payment device 200), according to one exemplary embodiment. Method 400 may begin at step 402.

At step 402, a user may receive a new contactless payment chip (e.g., payment chip 108, payment chip 218). User may receive a new contactless payment chip in response to an existing contactless payment chip becoming compromised. In other words, a third party individual used information in payment chip to make an unauthorized, fraudulent purchase. User may also receive a new contactless payment card if the existing contactless payment chip is lost or damaged.

At step 404, a user may remove the existing contactless payment chip from the payment device. For example, the user may remove the existing contactless payment chip from payment chip receptacle housing the existing payment chip. In some embodiments, the user may slide the payment chip from a slit in the payment chip receptacle. In some embodiments, the user may move the arms of the payment chip receptacle from a closed position to an open position, and remove the payment chip.

At step 406, a user may position the new contactless payment chip on the payment device. For example, the user may position the new contactless payment chip in the payment chip receptacle. In some embodiments, the user may slide payment chip in the slit in the payment chip receptacle. In some embodiments, the user may position the payment chip in the payment chip receptacle, and secure the payment chip using the one or more arms of the payment chip receptacle. The new contactless payment chip may be positioned in the payment chip receptacle such that the new contactless payment chip contacts one or more circuits at one or more contact points. In some embodiments, the user may secure the new contactless payment chip in the payment chip receptacle via a hatch that holds the new contactless payment chip in place from above. In some embodiments, the user may secure the new contactless payment chip in the payment chip receptacle through a snap-fit joint. In some embodiments, the user may secure the new contactless payment chip in the payment chip receptacle via an adhesive.

As such, the user may replace a compromised contactless payment chip, without replacing the entire device housing the contactless payment chip.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. An apparatus, comprising:
   a first liner;
   a second liner;
   one or more fastening components coupling the first liner to the second liner, defining an opening between; and
   one or more prongs positionable between a closed position within the opening and an open positioning exterior to the opening, the one or more prongs comprising:
   a payment prong, the payment prong comprising:
      a body free from any personal identification information;
      a payment chip receptacle attached to the body; and
      a payment chip positioned in the payment chip receptacle,
   the payment chip removable therefrom.

2. The apparatus of claim 1, wherein the body comprises:
   a shaft extending between the payment chip receptacle and the opening, the shaft comprising one or more openings formed therethrough, each of the one or more openings configured to receive each of the one or more fastening components.

3. The apparatus of claim 2, wherein the shaft comprises:
   one or more printed circuits contained therein, the one or more printed circuits contacting the payment chip at one or more contact points.

4. The apparatus of claim 3, wherein the apparatus further comprises:
   a power source positioned within the opening, the power source coupled to each of the one or more printed circuits.

5. The apparatus of claim 3, wherein the one or more printed circuits enable the payment chip to communicate with external device via a wireless connection.

6. The apparatus of claim 5, wherein the wireless connection is one of radio frequency identification (RFID), near field communication (NFC), or Bluetooth.

7. The apparatus of claim 2, wherein the shaft is formed from a non-metal material.

8. The apparatus of claim 1, wherein the payment chip receptacle fully surrounds the payment chip.

9. The apparatus of claim 1, wherein the payment chip receptacle comprises:
   two or more arms configured to hold the payment chip in position.

10. The apparatus of claim 1, wherein the one or more prongs further comprise:
    one or more tools.

11. A payment device, comprising:
    a multi-tool apparatus comprising a body free from any personal identification information;
    a payment chip receptacle coupled with the body, the payment chip receptacle comprising two or more arms movable between an open position and a closed position; and
    a payment chip positioned in the payment chip receptacle, wherein the payment chip is secured by the two or more arms, wherein the payment chip is removable from the payment chip receptacle when the two or more arms are in the open position.

12. The payment device of claim 11, wherein the payment chip is secured to the payment chip receptacle when the two or more arms are in the closed position.

13. The payment device of claim 11, wherein the payment chip receptacle is coupled to a tool of the multi-tool apparatus.

14. The payment device of claim 13, further comprising:
    a printed antenna integrated with the tool of the multi-tool apparatus, the printed antenna coupled with the payment chip.

15. The payment device of claim 14, wherein the multi-tool apparatus further comprises a power source disposed therein.

16. The payment device of claim 13, wherein the tool of the multi-tool apparatus is formed from a non-metal material.

17. The payment device of claim 13, wherein the tool of the multi-tool apparatus is movable between a closed position within the body of the multi-tool apparatus and an open position exterior to the body of the multi-tool apparatus.

18. The payment device of claim 11, wherein the payment chip receptacle fully surrounds the payment chip.

19. The payment device of claim 11, wherein the payment chip receptacle is formed from a non-metal material.

* * * * *